(12) United States Patent
Martin

(10) Patent No.: US 6,861,461 B1
(45) Date of Patent: Mar. 1, 2005

(54) ORGANICALLY MODIFIED METAL OXIDES FOR POLYMER GRAFTING

(75) Inventor: Thomas J. Martin, Williamson County, TX (US)

(73) Assignee: Sasol North America Inc., Houston, TX (US)

( * ) Notice: Subject to any disclaimer, the term of this patent is extended or adjusted under 35 U.S.C. 154(b) by 0 days.

(21) Appl. No.: 10/695,708

(22) Filed: Oct. 29, 2003

(51) Int. Cl.$^7$ .......................... C08K 3/22; C08L 51/06
(52) U.S. Cl. .................. 524/437; 525/64; 525/232; 525/240; 525/241; 525/262; 525/263
(58) Field of Search ............................ 524/437; 525/64, 525/232, 240, 241, 262, 263

(56) References Cited

U.S. PATENT DOCUMENTS

| | | |
|---|---|---|
| 3,956,212 A | 5/1976 | Sakaguchi et al. |
| 4,338,228 A | 7/1982 | Inoue et al. |
| 4,420,341 A | 12/1983 | Ferrigno |
| 4,720,516 A | 1/1988 | Kishida et al. |
| 4,743,644 A | 5/1988 | Skipper et al. |
| 5,182,410 A | 1/1993 | Misra |
| 6,103,803 A | 8/2000 | Cheung et al. |
| 6,177,088 B1 * | 1/2001 | Guo et al. ............... 424/400 |
| 6,218,474 B1 | 4/2001 | Valligny et al. |
| 6,262,161 B1 | 7/2001 | Betso et al. |
| 6,403,721 B1 | 6/2002 | Ding et al. |

* cited by examiner

Primary Examiner—James J. Seidleck
Assistant Examiner—Olga Asinovsky
(74) Attorney, Agent, or Firm—C. J. Bushman; Browning Bushman P.C.

(57) ABSTRACT

A composition of matter or modifier for use in modifying unfunctionalized polymers comprising a metal oxide substrate that can be formed into a sol, a water soluable, acid moiety, having a hydrocarbyl group with olefinic unsaturation, bound to the metal oxide substrate and a water soluble, free radical initiator, the composition of matter generally being in the form of a dry powder that can be mixed with a polymer lacking functional groups whereupon when the mixture is subjected to conditions which result in the decomposition of the free radical initiator to form free radicals.

9 Claims, 1 Drawing Sheet

PP+M-PP+ALUMINA

PP+TREATED ALUMINA

ORGANICALLY MODIFIED METAL OXIDES FOR POLYMER GRAFTING

BACKGROUND OF THE INVENTION

1. Field of the Invention

The present invention relates to a modified metal oxide that can be grafted onto a polymeric substrate. The present invention also relates to a modified polymeric composition grafted with a modified metal oxide. Additionally, the present invention relates to methods for making the above described compositions.

2. Description of the Prior Art

In the use of polymers, it is frequently necessary to mix the polymers with certain fillers to impart desired properties, depending upon the nature of the filler and the intended end use of the polymer. There are many polymers that, because of their lack of functional groups, do not strongly interact with untreated fillers. Accordingly, and as taught in the prior art, it is generally necessary to use expensive materials, e.g., organo silanes, to treat the filler surface to make it compatible with the unfunctionalized polymer.

One method that has been used to functionalize a filler so as to make it more interactive with polymers lacking functional groups is to add a fraction of a maleated polymer to the bulk polymer/filler composition. For example, in the case of polypropylene, maleated polypropylenes have been used to improve the interaction of the polymers with filler materials. Generally speaking, maleated polypropylene is achieved by mixing an unmodified polypropylene, maleic anhydride and an organic peroxide to form a homogeneous mixture, e.g., by using an extruder. The extrudent modified polypropylene, i.e., a maleated polypropylene, being formed from the reaction of the peroxide with maleic anhydride and the polymer at the elevated temperature in the extruder. In the reaction, the peroxide decomposes to produce free radicals that initiate a reaction between the maleic anhydride and the polymer chain. In this regard, the peroxide radicals are capable of abstracting hydrogen from the polymer backbone, such that the polymer is reactive toward the maleic anhydride, the net result being the formation of a polypropylene chain that has maleic groups grafted along the backbone of the polymers.

This maleated polypropylene is subsequently extruded, or otherwise mixed, with fillers such as fiberglass, carbon black, silica, etc. together with a larger fraction of unmodified or bulk polymer, e.g., polypropylene as the bulk material. Thus, the mixture will comprise primarily unmodified polymer, e.g., polypropylene, a smaller but effective amount of a maleated (modified) polypropylene and the filler. It should be noted that in this mixture there is generally enough moisture available to result in hydrolysis of the maleic anhydride groups to produce acid groups that in turn interact and bond with the filler surface. Accordingly, the maleated polypropylene, in this way, acts as a coupling agent to form a bond between the filler and the bulk or unmodified polymer, e.g., polypropylene.

The polymers that can be modified in the above manner to act as coupling agents between both polymers and fillers include not only polypropylene but virtually any polyolefin, e.g., polyethylene, as well as polymers of unsaturated monomers such as isoprene, butadiene, styrene-butadiene, etc.

The prior art described above suffers from several disadvantages. For one, only a fraction of the maleic groups are in contact with the filler surface. Additionally, the free peroxide, which is usually hydrophobic and is well dispersed in the polymer, can reduce the molecular weight of the polymer chain by chain scission during the extrusion step. The free peroxide can also cause cross-linking of the polymer chains by combination of two polymer radicals, thereby dramatically changing the physical characteristics of the polymer. Lastly, the above described process requires two polymers, i.e., the modified polymer and the unmodified polymer.

SUMMARY OF THE INVENTION

Figure 1:
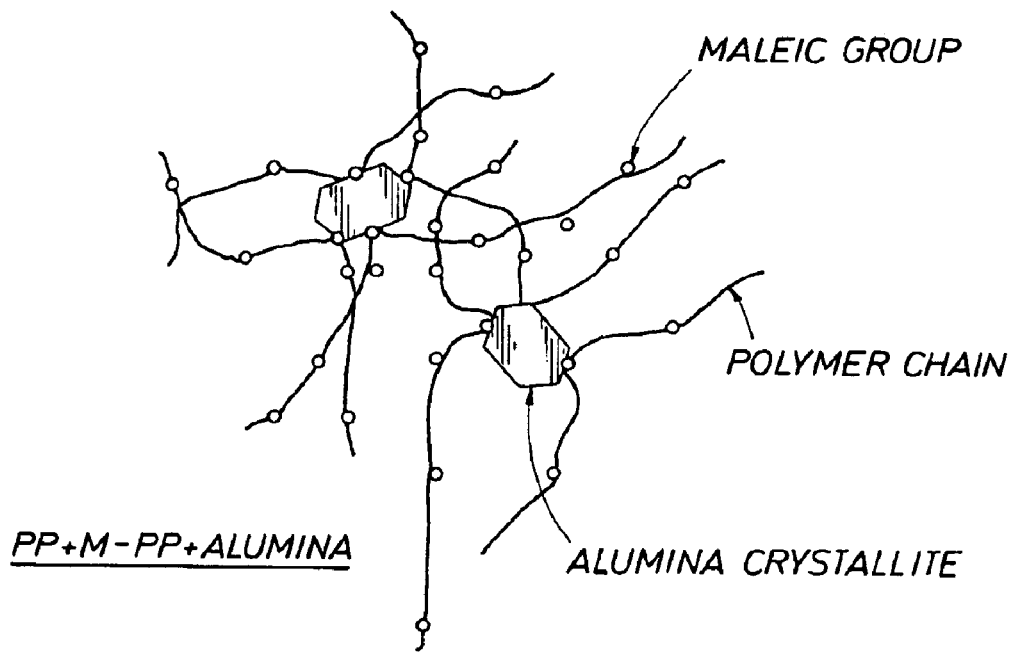
FIG. 1 is a schematic depiction of a prior art modified polypropylene.

In a preferred aspect, the present invention provides a composition of matter comprising a metal oxide substrate, a water soluble, acid moiety having a hydrocarbyl group with olefinic unsaturation bound to the metal oxide substrate and a water soluble, free radical initiator.

In yet another preferred embodiment of the present invention, there is provided a functionalized polymeric composition comprising the reaction product of a metal oxide substrate, a water soluble, acid moiety having a hydrocarbyl group with olefinic unsaturation acid bound to the metal oxide substrate and a water soluble, free radical initiator and a polymer that is substantially free of functional groups.

In a further preferred aspect of the present invention, there is provided a process for making a modified metal oxide comprising forming an aqueous sol of the metal oxide, mixing the aqueous sol with a water soluble, acid moiety having a hydrocarbyl group with olefinic unsaturation, and mixing the aqueous sol and the acid moiety with a water soluable, free radical initiator to form an aqueous medium precursor, a dry modified metal oxide being recovered from the aqueous precursor.

In still another preferred embodiment of the present invention, there is provided a process for producing a functionalized polymer comprising mixing a composition of matter comprising a metal oxide substrate, a water soluble, acid moiety having a hydrocarbyl group with olefinic unsaturation bound to the metal oxide substrate and a water soluble, free radical initiator with a polymer that is substantially free of functional groups under conditions to decompose the free radical initiator.

DESCRIPTION OF PREFERRED EMBODIMENTS

The metal oxides, which includes the oxides as well as their hydrated forms, that can be employed in the compositions and methods of the present invention include any metal oxide that can be treated to form an aqueous sol. The term "sol" as used herein is intended to mean not only a solution or colloidal dispersion, but also a non-colloidal dispersion wherein the particles are small enough to remain suspended in the aqueous medium. Thus, in addition to solutions and colloids, emulsions are also encompassed by the word "sol." Furthermore, the metal oxide need not be pure but can be part of a naturally occurring mineral deposit, e.g., a clay, the only requirement being that a sol can be formed of the naturally occurring material. Non-limiting examples of suitable metal oxides include oxides of aluminum, silicon titanium, zinc, magnesium and mixtures of various of such metal oxides that occur in clays. Especially preferred, are oxides of alumina such as boemite alumina, gamma alumina, delta alumina, theta alumina, alpha alumina, silica-alumina mixed oxides, titania-alumina mixed oxide, silicom oxides, titanium oxides, as well as mixtures thereof. In a particularly preferred embodiment, the mixed oxide will be an alumina and more specifically, a boemite alumina.

The water soluble, acid moieties that can be used include a wide variety of organic compounds, substituted and unsubstituted, which have olefinic saturation somewhere in the molecule, preferably at a terminal position in the molecule. Indeed, to qualify for use in the present invention, the acid moiety need only be water soluble, have an acid grouping that can bind to the metal oxide substrate and have a hydrocarbyl group having olefinic unsaturation. Non-limiting examples of suitable acid moieties include aliphatic carboxylic acids, aromatic carboxylic acids, sulfonic acid derivatives of unsaturated carboxylic acids, sulfinic acid derivatives of unsaturated carboxylic acids, phosphonic acid derivatives of unsaturated carboxylic acids, sulfate derivatives of unsaturated carboxylic acids, phosphate derivatives of unsaturated carboxylic acids, salts of any of the above-name acids, as well as mixtures of any of such acids and/or their salts. Also suitable as acid moieties are compounds such as styrene sulfonic acid, ethylene glycol methacrylate phosphate and other such compounds which contain an acid type grouping, e.g., sulfonic carboxylic, phosphate, sulfate, etc. Particularly preferred acids include acrylic acid, methy-crylic acid, maleic acid, fumaric acid, vinyl sulfonic acid, vinyl phosphonic acid, styrene-sulfonic acid, etc.

The free radical initiators that are useful in the practice of the present invention can comprise virtually any chemical compound or mixture thereof that is water soluble and that will decompose to form free radicals. It is believed that in the process of the present invention, the free radicals formed upon decomposition of the free radical initiator act to abstract hydrogen from the polymer backbone and initiate polymerization of the unsaturated organic acid that is bound to the surface of the metal oxide. The result is a metal oxide grafted onto polymer chains via acid linkages to the metal oxide surface. Non-limiting examples of suitable free radical initiators include organic and inorganic peroxides, persulfates, azonitrile compounds, etc. Combinations of free radical initiators can be used if desired. Specific, non-limiting examples of suitable free radical initiators include ammonium persulfate, sodium persulfate, potassium persulfate, t-butyl hydroperoxide, cumene hydroperoxide, azobisdimethylvaleronitrile, azobisisobutyronitrile. While typically, the free radical initiator used in the present invention will be activated by thermal decomposition, it is to be understood that free radical initiators that are activated by ionizing radiation can also be employed.

To prepare the modified metal oxides of the present invention, the metal oxide in the form of an aqueous sol is treated with the desired acid. It may be necessary to employ hydrothermal treatment to peptize the metal oxide or to effect a better bond between the acid moiety and the surface groups of the metal oxide. The reaction between the metal oxide and the acid moiety is typically conducted in an aqueous solution wherein aqueous solution is intended to include water as well as solutions of water and water soluble, polar organic materials such as lower alcohols. Interaction between the metal oxide and the acid moiety can occur not only in the sol during hydrothermal treatment but also when the sol is subjected to drying. Thus, the proposed structure of a modified metal oxide will have the acid groups attached or bound to the metal oxide surfaces and the hydrocarbyl groups containing the olefinic unsaturation being substantially free of any attachment to the metal oxide surfaces. Although spray drying is preferred, any conventional form of drying an aqueous/solid mixture can be employed.

Prior to drying, whether it be spray drying or some other technique, a water soluble peroxide is added to the sol of the metal oxide and the acid moiety. It is preferred that the water soluble free radical initiator be added after any hydrothermal treatment, if necessary, and prior to spray drying. It is also important that the spray drying or whatever drying technique is employed, be of a type which does not exceed the decomposition temperature of the free radical initiator. When the three component mixture is dried, it is recovered as a dried powder.

When preparing the modified polymers of the present invention, dried powder comprising the modified metal oxide and the free radical initiator is mixed with an unmodified polymer, e.g., polypropylene, at elevated temperatures, i.e., a temperature sufficient to cause decomposition of the free radical initiator. This results in the formation of highly reactive free radicals which both abstract hydrogen from the polymer backbone and initiate polymerization of the olefinic unsaturation forming part of the acid moiety attached to the surface of the metal oxide. The net result is a metal oxide grafted onto polymer chains via acid linkages bound to the surface of the metal oxide. In effect the modified metal oxide is dispersed in the bulk polymer and bonded to the polymer matrix via polymer chain entanglements.

In preparing the modified metal oxides of the present invention, the amount of the acid moiety employed will be an effective amount wherein an effective amount, as used herein, is an amount of acid moiety to ensure at least 10 percent coverage of the metal oxide surface, preferably 25 percent, most preferably at least 50 percent of the metal oxide surface. Stated differently, the amount of acid employed will be such that at least 10 percent of the acid reactive sites on the metal oxide are bonded to the acid moiety and preferably 25 percent, most preferably, 50 percent of the acid sites on the mixed oxide are bonded to the acid moiety. It is especially preferred that all reactive acid sites on the metal acids are bonded to the acid moiety.

The amount of free radical initiator incorporated into the modified metal oxide of the present invention will generally be in the range of from about 0.05 to about 2 percent by weight based on the weight of metal oxide, calculated as metal oxide. It will be apparent to those skilled in the art that the amount of acid moiety employed as well as the amount of free radical initiator can vary widely depending on the nature of the metal oxide, the polymer that is to be modified, the nature of the acid moiety and the nature of the free radical initiator. However, those skilled in the art can readily determine the relative amounts of those components to arrive at a desired modified metal oxide.

The amount of the modified metal oxide that will be added to the unmodified polymer can vary over wide limits depending upon the nature of the polymer, the degree of modification desired and the type of fillers to be employed. Generally speaking the amount of the modified metal oxide containing the free radical initiator will range from about 1 to about 30 percent by weight based on the combined weight of the polymer/metal oxides.

In forming the modified polymers of the present invention, the modified metal oxide and peroxide powder are mixed with the desired polymer which is then subjected to mixing under conditions which causes decomposition of the free radical initiator to initiate polymerization of the olefinic unsaturation in the acid moiety. Generally, this can be accomplished by mixing in an extrusion device at a temperature that results in thermal decomposition of the free radical initiator. By this technique, there is produced a modified polymer which has the metal oxide grafted to the polymer chains via the acid linkages to the metal oxide surface. During this preparation of the modified polymer, it is also possible to add other desired fillers which, because of the modification of the polymer, will now be more compatible with the polymer. Alternatively, the modified polymer can be subsequently mixed with the desired filler using techniques well known to those skilled in the art of forming filled polymers.

The polymers that can be employed in the present invention include polyolefins such as polypropylene, polyethylene, polyisobutylene, poly-butadiene, styrene-butadiene rubbers, etc. Indeed, virtually any polymer which, in its normal state, lacks sufficient functional groups to be compatible with fillers can be employed, it being one of the objects of the present invention to functionalize or modify such polymers to make them compatible with fillers.

To more fully illustrate the present invention, the following non-limiting examples are presented.

EXAMPLE 1

A 182 g quantity of CATAPAL® 200 boehmite alumina powder marketed by SASOL North America, Inc. was dispersed in 1439 g of deionized water to form a sol. Separately, 2.1 g of maleic acid was dissolved in 200 g deionized water. The acid solution was added to the alumina sol and allowed to stir for 10 minutes before charging to a hydrothermal reactor. A 2 L electrically heated, stirred reactor, closed to the atmosphere, was used to heat the mixture at 120° C. for 30 minutes. The sol was dumped from the reactor and 0.11 g of cumene hydroperoxide, predissolved in 100 g deionized water plus 8.4 g isopropyl alcohol was added. The mixture was then spray dried at an inlet temperature of 220° C. and a 100° C. outlet temperature and collected as a free-flowing fine, white powder. The powder produced was blended with a polypropylene homopolymer resin and mixed in a Brabender single screw extruder at 180–200° C. The resulting modified polymer readily blends with fillers.

EXAMPLE 2

The procedure of Example 1 was followed with the exception that the alumina was added to 1539 g of deionized water, the acid moiety comprised 7.5 g of a 50 percent solution of ethylene glycol methacrylate phosphate dissolved in 100 g of deionized water and the mixture was heated in the stirred reactor at 120° C. for 60 minutes. The sol from the reactor was mixed with the cumene hydroperoxide and spray dried at the same condition specified in Example 1. The modified alumina is dry blended with the polypropylene homopolymer resin and mixed in a extruder at 180 to 200° C. to produce a modified polypropylene resin that will readily accept fillers.

Figure 2:
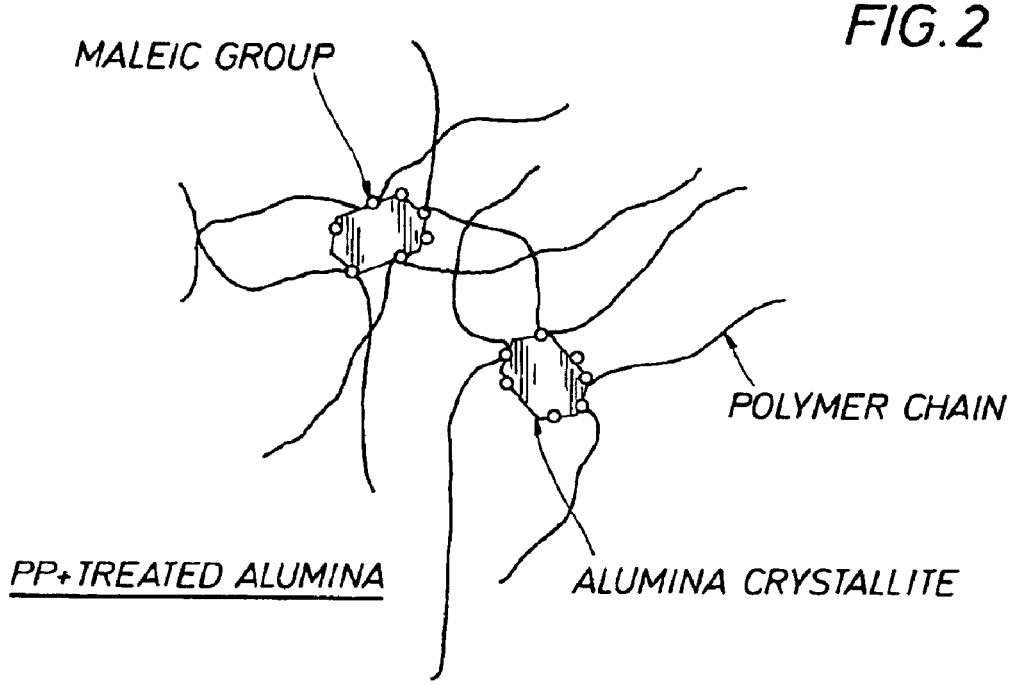
FIG. 2 is a schematic depiction of a modified polypropylene in accordance with the present invention.

The present invention provides many advantages over the prior art. For one, the process does not require the use of organic solvents since the aqueous sols of the metal oxides are formed in water. Additionally, the only two components necessary are the modified metal oxide and the unmodified polymer. Unlike the prior art, the present invention does not require the use of expensive silanes as coupling agents. Additionally, the hydrophillic free radical initiators and the acid moieties stay in the vicinity of the alumina surface and do not graft polymer unnecessarily resulting in fewer side reactions (no cross linking) and more efficient grafting. This can be seen by comparing FIGS. 1 and 2 which show a polymer modified according to the prior art (FIG. 1) and a polymer modified according to the present invention (FIG. 2). As can be seen in FIG. 1, the maleic acid group are distributed along the polymer chain greatly enhancing the chances of crosslinking. On the other hand, in the case of the compositions of the present invention, as shown in FIG. 2, the maleic acid groups are bound to the alumina crystallite that, in turn, is bound to the polymer chain, meaning that no maleic acid groups are distributed along the polymer chains. Additionally, the metal oxide surface can be thoroughly covered with the acid moiety essentially leaving no unmodified surface on the metal oxide.

Another advantage of the present invention is that since there is a less tendency of modified polymers made according to the present invention to crosslink, the composites are more amenable to recycling. Lastly, since the acid moiety is prereacted with and bonded to the metal oxide surface prior to compounding into a polymer, no insitu service reactions are necessary.

The foregoing description and examples illustrate selected embodiments of the present invention. In light thereof, variations and modifications will be suggested to one skilled in the art, all of which are in the spirit and purview of this invention.

What is claimed is:

1. A composition of matter comprising:
   a metal oxide substrate which can be formed into a sol;
   a water soluble, acid moiety having a hydrocarbyl group with olefinic unsaturation bound to said metal oxide substrate; and
   a water soluble, free radical initiator.

2. The composition of claim 1 wherein said metal oxide comprises an alumina.

3. The composition of claim 2 wherein said alumina is selected from the group consisting of boemite alumina, gamma alumina, delta alumina, theta alumina, alpha alumina, silica-alumina mixed oxides, titania-alumina mixed oxides and mixtures thereof.

4. The composition of claim 3 wherein said alumina comprises boemite alumina.

5. The composition of claim 1 wherein said acid moiety is selected from the group consisting of (a) aliphatic carboxylic acids, (b) aromatic carboxylic acids, (c) sulfonic acid derivatives of unsaturated carboxylic acids, (d) sulfinic acid derivatives of unsaturated carboxylic acids, (e) phosphoric acid derivatives of unsaturated carboxylic acids, (g) sulfate derivatives of unsaturated carboxyl acids, phosphate derivatives of unsaturated carboxylic acids, (h) salts of (a)–(g) and mixtures thereof.

6. The composition of claim 1 wherein said free radical initiator is selected from the group consisting of persulfates, organic peroxides, inorganic peroxide, azonitrile compounds and mixtures thereof.

7. A functionalized polymeric composition comprising:
   the reaction product of any of the compositions of claims 1–6 and a polymer that is substantially free of functional groups.

8. A process for making a modified metal oxide comprising:
   forming an aqueous sol of said metal oxide;

mixing said aqueous sol of said metal oxide with a water soluble, acid moiety having a hydrocarbyl group with olefinic unsaturation; and mixing said aqueous sol and said acid moiety with a free radical initiator to form an aqueous medium precursor; and removing liquid from said aqueous precursor and recovering a dry, modified metal oxide.

9. A process for producing a functionalized polymer comprising:

mixing a composition of matter according to any of claims 1–6 with a polymer that is substantially free of functional groups under conditions to decompose said free radical initiator.

* * * * *

UNITED STATES PATENT AND TRADEMARK OFFICE
CERTIFICATE OF CORRECTION

PATENT NO. : 6,861,461 B1
DATED : March 1, 2005
INVENTOR(S) : Thomas J. Martin

It is certified that error appears in the above-identified patent and that said Letters Patent is hereby corrected as shown below:

<u>Column 6,</u>
Line 53, change "phosphoric" to -- phosphonic --

Signed and Sealed this

Twenty-fourth Day of May, 2005

JON W. DUDAS
*Director of the United States Patent and Trademark Office*